(12) United States Patent
Kawai (10) Patent No.: US 6,810,737 B2
(45) Date of Patent: Nov. 2, 2004

(54) RESONANT ELEMENT AND VIBRATION ADJUSTING METHOD THEREFOR

(75) Inventor: Hiroshi Kawai, Yokohama (JP)

(73) Assignee: Murata Manfacturing Co., Ltd., Kyoto (JP)

( * ) Notice: Subject to any disclaimer, the term of this patent is extended or adjusted under 35 U.S.C. 154(b) by 122 days.

(21) Appl. No.: 09/730,461

(22) Filed: Dec. 5, 2000

(65) Prior Publication Data

US 2001/0004846 A1 Jun. 28, 2001

(30) Foreign Application Priority Data

Dec. 21, 1999 (JP) .......................................... 11-362886

(51) Int. Cl.⁷ ............................................. G01P 15/18
(52) U.S. Cl. ................................. 73/504.02; 73/504.11; 73/504.12
(58) Field of Search ........................ 73/504.02, 504.11, 73/504.12, 504.03, 504.04, 504.08

(56) References Cited

U.S. PATENT DOCUMENTS

| 5,780,740 A | * | 7/1998 | Lee et al. ................. 73/504.12 |
| 5,894,091 A | * | 4/1999 | Kubota ....................... 361/280 |
| 5,952,572 A | * | 9/1999 | Yamashita et al. ........ 73/504.04 |
| 6,430,998 B2 | * | 8/2002 | Kawai et al. ............. 73/504.12 |

FOREIGN PATENT DOCUMENTS

| DE | 19542799 A1 | 5/1996 |
| DE | 19620831 A1 | 11/1996 |
| DE | 19620832 A1 | 11/1996 |
| DE | 19654303 A1 | 7/1997 |
| DE | 19828606 A1 | 1/1999 |
| DE | 69513451 T2 | 5/2000 |
| JP | 61-114123 | 5/1986 |
| JP | 8-061959 | 3/1996 |
| JP | 8-114456 | 5/1996 |
| JP | 08075473 A | 9/1996 |
| JP | 10-103960 | 4/1998 |
| JP | 11-064001 | 3/1999 |

* cited by examiner

Primary Examiner—Hezron Williams
Assistant Examiner—Jacques M. Saint-Surin
(74) Attorney, Agent, or Firm—Keating & Bennett, LLP (57) ABSTRACT

A resonant element including: a vibrating body vibratable in orthogonal X- and Z-directions; exciting means for causing the vibrating body to be subjected to an excitation vibration in the X-direction; excitation deflection detecting means for detecting the deflection of the vibrating body in the Z-direction during the excitation vibration thereof in the X-direction; and excitation deflection inhibiting means for inhibiting the deflection of the vibrating body in the Z-direction.

20 Claims, 9 Drawing Sheets

RESONANT ELEMENT AND VIBRATION ADJUSTING METHOD THEREFOR

BACKGROUND OF THE INVENTION

1. Field of the Invention

The present invention relates to a resonant element used as an angular velocity sensor, acceleration sensor, filter, or the like, and to a vibration adjustment method therefor.

2. Description of the Problems Leading to the Present Invention

Figure 9A:
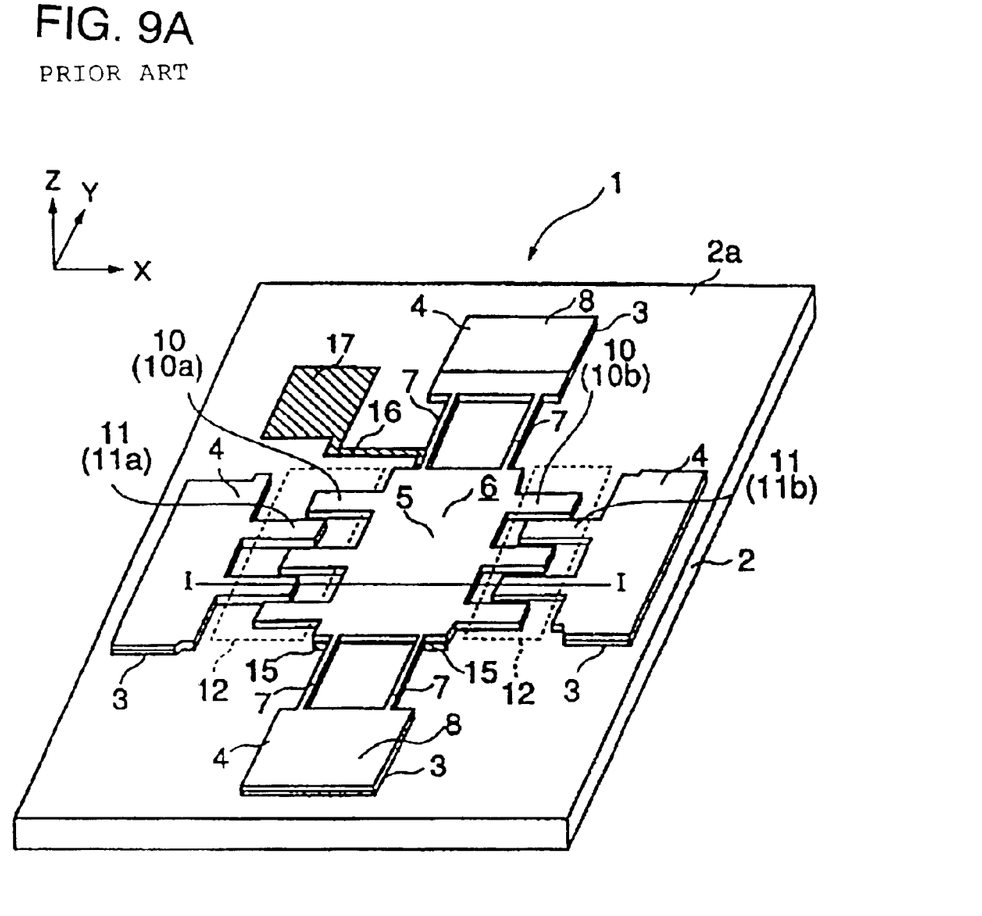
FIGS. 9A and 9B are explanatory views illustrating another previous example of a resonant element.
Figure 9B:
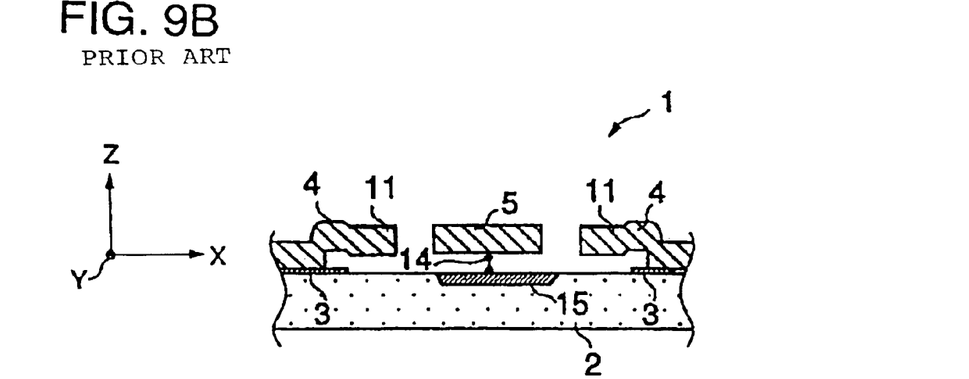

FIG. 9A is a perspective view showing a previous resonant element invented by the inventor of the present invention. FIG. 9B is a sectional view taken along the line I—I in FIG. 9A.

The resonant element shown in FIGS. 9A and 9B is a resonant element 1 which is a microelement produced utilizing a conventional silicon micromachining technique and the like. The resonant element 1 is produced by forming a nitride film 3 on a silicon fixed substrate 2, then forming a polysilicon film 4 thereover, and forming these films 3 and 4 into a predetermined set pattern by dry etching or the like.

As shown in FIGS. 9A and 9B, above the top surface 2a, which is a plane in the X-Y plane direction of the fixed substrate 2, a vibrator 5 is disposed in a state isolated from the fixed substrate 2. The vibrator 5 functions as a planar vibrating body 6. The vibrator 5 is supported via support beams 7 so as to be vibratable in the X-direction. One end side of each of the support beams 7 is fixed to the fixed substrate 2 via a fixing portion 8.

On the right and left sides (as viewed in FIG. 9A) of the vibrator 5, movable-side comb electrodes 10 (10a and 10b) are each formed outwardly in the X-direction, and fixed-side comb electrodes 11 (11a and 11b) are each disposed inwardly in the X-direction at positions opposed to the movable-side comb electrodes 10 and interdigitated therewith in a spaced relationship. The movable-side electrodes 10 and the fixed-side comb electrodes 11 are each connected to outside electrode pads (not shown) via conductive patterns (not shown), and thereby form exciting means 12.

For example, when AC voltages which are different in phase from each other by 180°, are applied to the fixed-side comb electrodes 11a and 11b while maintaining the movable-side comb electrodes 10a and 10b at a predetermined constant voltage (0 volt for example), electrostatic forces in directions opposite to each other occur between the movable-side comb electrodes 10a and the fixed-side comb electrodes 11a, and between these movable-side comb electrodes 10b and the fixed-side comb electrodes 11b, and by these electrostatic forces, the vibrator 5 is caused to be subjected to an excitation vibration in the X-direction.

In the resonant element 1 with the above-described features, when the resonant element 1 is rotated around the Y-axis while being caused to be subjected to an excitation vibration in the X-direction, as described above, a Coriolis force occurs in the Z-direction orthogonal to the X-Y plane direction. This Coriolis force is applied to the vibrator 5 (planar vibrating body 6), and the vibrator 5 vibrates in the direction of the Coriolis force. By measuring the electric signal corresponding to the magnitude of the vibration amplitude of the vibrator 5 due to the Coriolis force occurring at this time, for example, the magnitude of a rotational angular velocity can be detected.

In the case where the resonant element 1 is used as an angular velocity sensor, there is provided a detecting portion for measuring the electric signal corresponding to the magnitude of vibration amplitude of the vibrator 5 due to a Coriolis force.

When the resonant element 1 is produced, the resonance frequency of the vibrator 5 (planar vibrating body 6) in the direction of a Coriolis force (Z-direction) is previously set at the design stage to the resonance frequency in the X-direction, and the shape, dimensions, weight, etc. of the vibrator 5 are designed and implemented so that the resonance frequency is obtained. In many cases, however, the shape, dimensions, weight, etc. of the vibrator 5 are not implemented as designed because of the machining accuracy of the silicon micromachining technique. Accordingly, deviation of the resonance frequency of the vibrator 5 from the designed frequency often occurs. If the vibration of the vibrator 5 is in a resonant state, the amplitude thereof is greatly amplified by virtue of the Q (quality factor) value related to the structure, but if the frequency deviates, a problem arises in that the amplitude is not amplified nearly as much, resulting in the sensitivity of the resonant element being significantly reduced. It is therefore necessary to adjust the resonance frequency of the vibrator 5 to the set frequency in design by performing trimming with respect to the vibrator 5 and/or the support beams 7 by, for example, a complicated machining process.

The resonant element 1 is, however, a minute element, therefore, it is practically impossible, because of the accuracy of conventional mechanical trimming techniques, to perform trimming of the minute planar vibrating body 6 and/or the support beams 7 so as to have the desired dimensions, shape, and weight, etc. It has, therefore, been difficult to adjust the resonance frequency of the planar vibrating body 6 to a set value.

In the resonant element 1, therefore, a conductive layer 15 for providing an electrostatic attractive force 14 is provided on the fixed substrate 2 at the position opposed to the vibrator 5 with an interval interposed in the Z-direction, as illustrated in FIGS. 9A and 9B.

As shown in FIG. 9A, the conductive layer 15 is connected to a conductive pad 17 via a conductive pattern 16. By controlling the voltage to be applied to the conductive layer 15 via the conductive pattern 16 and conductive pad 17, the resonance frequency of the vibrator 5 is adjustable to a set value.

Once a DC voltage is applied to the conductive layer 15, an electrostatic attractive force acts on the vibrator 5, and this acts on the vibrator 5 as an electrostatic spring. Specifically, when the vibrator 5 vibrates in a direction such that the vibrator 5 approaches the fixed substrate 2, the electrostatic attractive force acts in the direction such that the amplitude is increased, so that the application of the DC voltage to the conductive layer 15 has an effect of generating a force in the direction opposite to the direction of the force of a mechanical spring. This results in a reduction in the resonance frequency of the vibrator 5 in the Z-direction. Since this reduced amount of the resonance frequency varies in accordance with the magnitude of the electrostatic attractive force 14 applied, a fine-adjustment of the resonance frequency of the vibrator 5 from the natural frequency thereof to the lower frequency side can be performed by adjusting the magnitude of the DC voltage applied to the conductive layer 15.

Utilizing this effect, by designing the natural resonance frequency of the vibrator 5 in the Z-direction to be slightly higher than the most sensitive resonance frequency (the frequency equal to the resonance frequency in the X-direction), in other words, by designing the resonance frequency of the vibrator 5 in the Z-direction to be higher than the resonance frequency thereof in the excitation vibrational direction by the exciting means 12, the vibrator 5 can be resonated at a predetermined resonance frequency by adjusting the magnitude of the DC voltage applied to the conductive layer 15.

However, although the adjustment of the resonance frequency for the vibrator 5 has been performed by providing the conductive layer 15, in some cases, characteristics such as S/N (signal-to-noise) ratio have deteriorated due to an increase in the noise of the resonant element 1.

Investigation by the present inventor into the reason for the deterioration of the characteristics, has found that the deterioration of characteristics is attributable to the vibrating conditions of the vibrator 5.

Figure 8A:
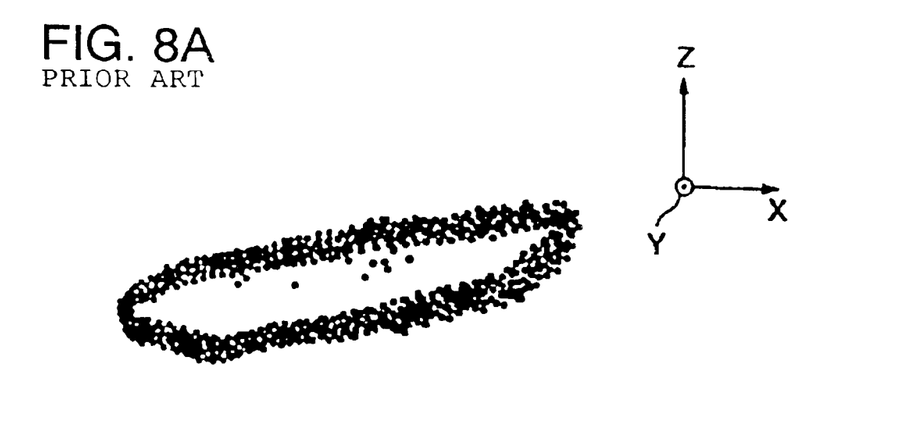
FIGS. 8A and 8B are explanatory views illustrating an example of a vibrating state of a vibrating body in a X-Z plane.
Figure 8B:
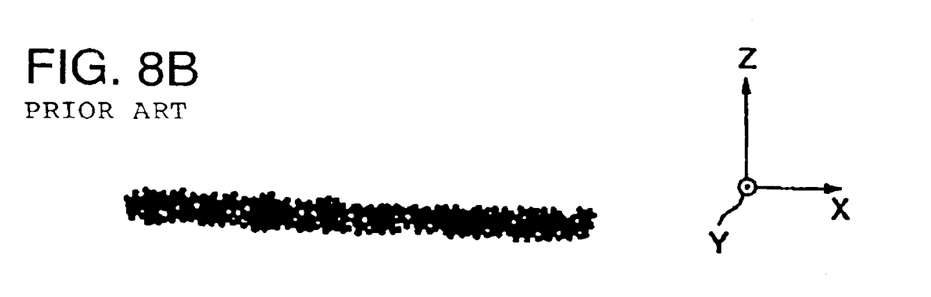

FIGS. 8A and 8B each show vibrating states of the vibrator 5 in the X-Z plane, observed in experiments by the present inventor. If there is no angular velocity around the Y-axis when the vibrator 5 is caused to be subjected to an excitation vibration, it is desirable that vibrator 5 be subjected to an excitation vibration in the X-direction horizontally along the plane 2a in the X-Y plane direction of the fixed substrate 2, as illustrated in FIG. 10C, and substantially without deflection in the Z-direction as shown in FIG. 8B.

Figure 10A:
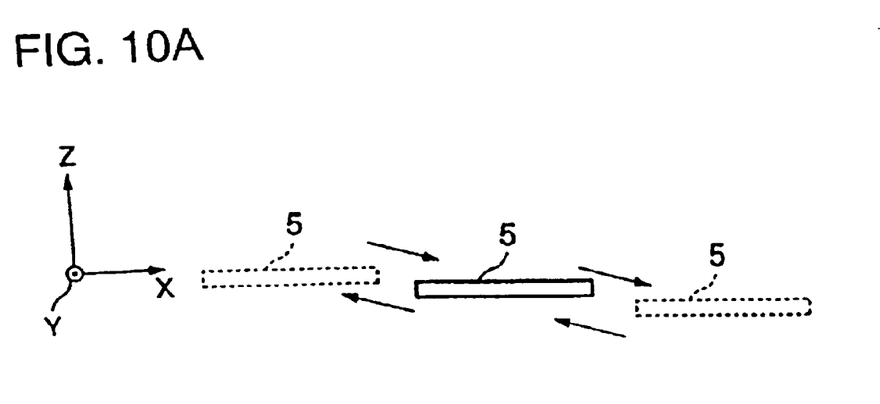
FIGS. 10A to 10C are explanatory views illustrating movements of vibrating body in the X-Z plane.
Figure 10B:
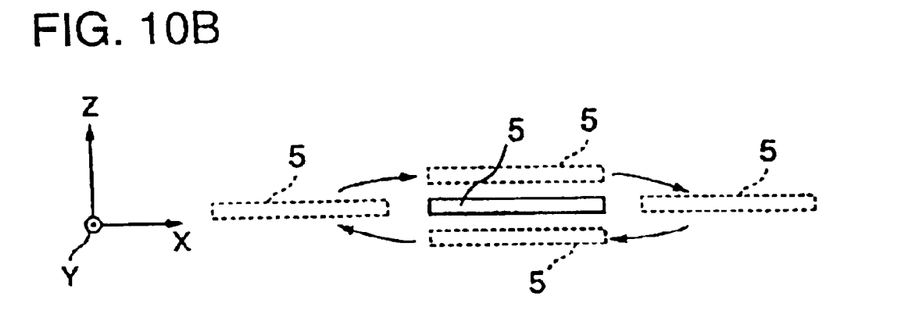
Figure 10C:
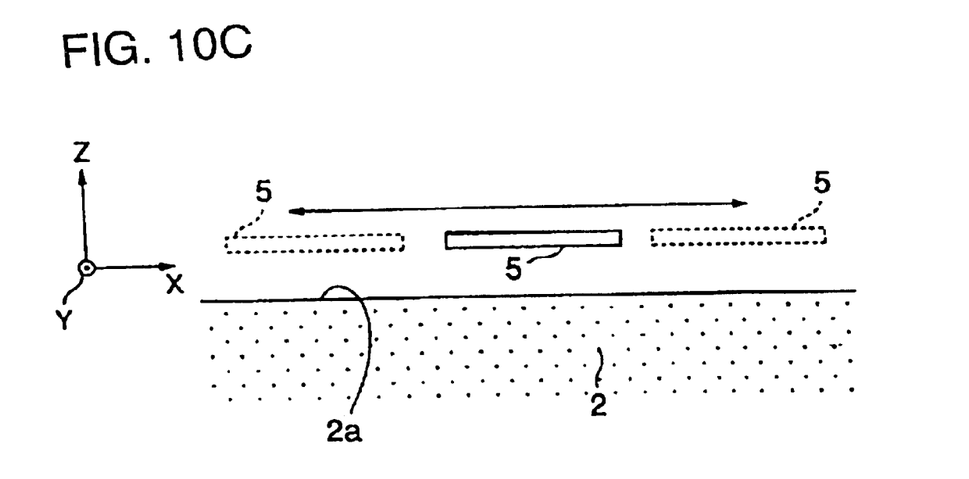

In contrast to this, in some cases, the vibrator 5 vibrates as shown in FIGS. 10A and 10B, and as illustrated in FIG. 8A, the vibrations of the vibrator 5 are in states deflecting by a large amount in the Z-direction which is the detection direction of a Coriolis force. In such cases, the resonant element 1 has been found to deteriorate in characteristics.

The present inventor, therefore, has noted that the deflection of the vibrator 5 in the Z-direction is attributable to the tilt of the vibrator 5 with respect to the substrate plane of the fixed substrate 2, and has proposed various resonant elements 1 each having excitation deflection inhibiting means for correcting the tilt of the vibrator 5 and for inhibiting the deflection of the vibrator 5 in the Z-direction.

Figure 6A:
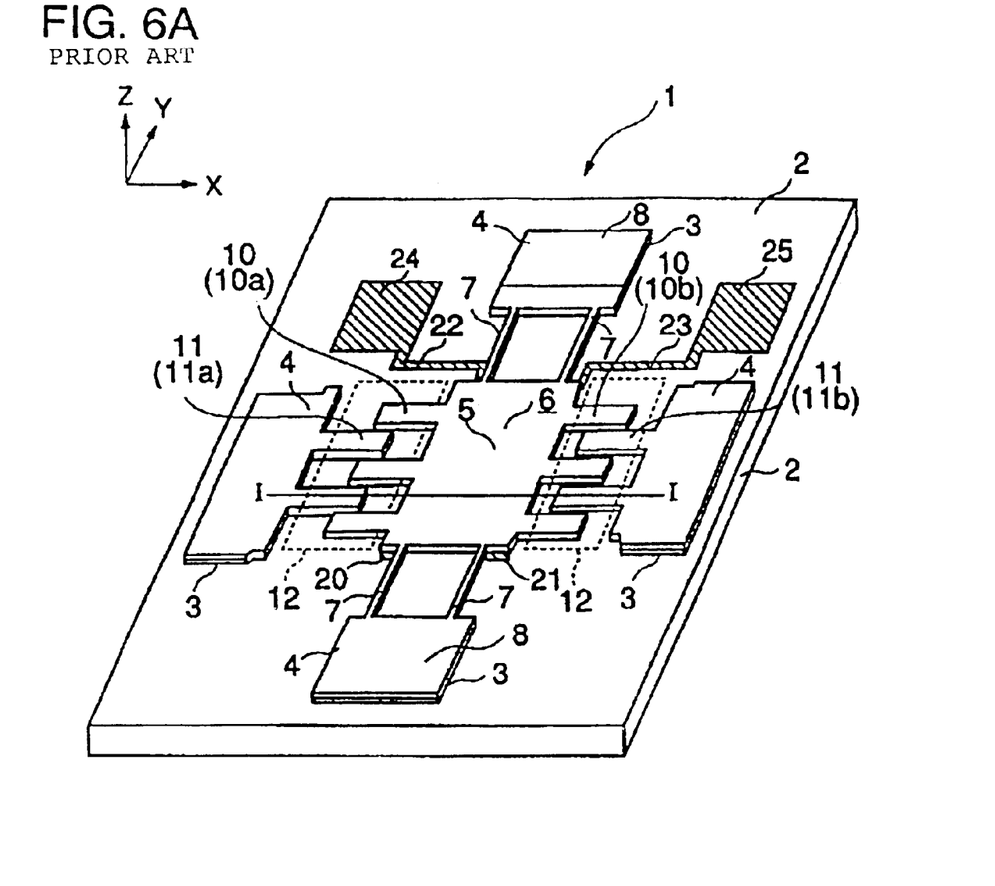
FIGS. 6A and 6B are explanatory views illustrating an example of a previous resonant element.
Figure 6B:
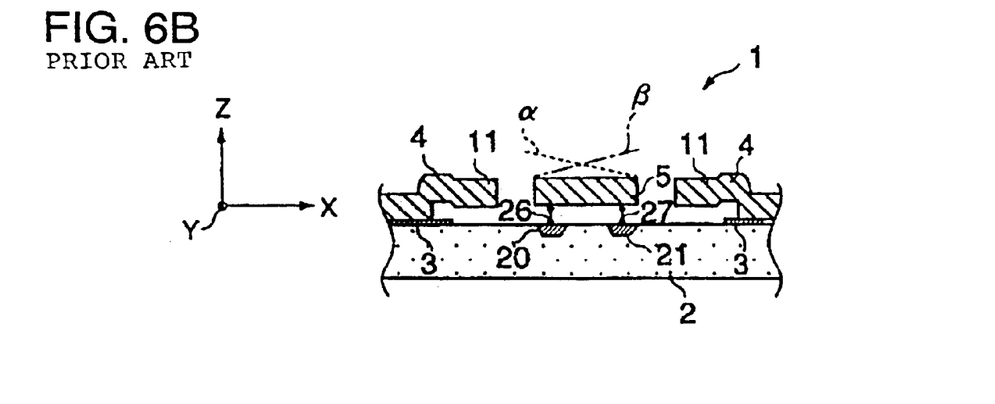

FIG. 6A is a perspective view showing one example of a previously proposed resonant element 1, and FIG. 6B is a sectional view taken along the line I—I in FIG. 6A. Here, in FIGS. 6A and 6B, the same components as those of the resonant element 1 in FIGS. 9A and B are identified by the same reference numerals, and repeated descriptions of the common components are omitted. It is to be noted that the resonant element 1 shown in FIGS. 6A and 6B is disclosed in Japanese patent application Nos. 11-197096 and 11-344648 and the corresponding U.S. and European patent applications.

In the resonant element 1 shown in FIGS. 6A and 6B, conductive layers 20 and 21 are disposed on the plane in the X-Y plane direction of the fixed substrate 2 so as to be opposed to each other with a gap in the X-direction therebetween, and to be opposed to the right or left (as viewed in FIG. 6A) edge area with a gap interposed. The conductive layers 20 and 21 are conductively connected to conductive pads 24 and 25 via conductive patterns 22 and 23, respectively. In the resonant element 1 shown in FIG. 6A and 6B, the conductor layers 20 and 21 constitute excitation deflection inhibiting means.

By individually applying DC voltages to the conductive layers 20 and 21 via the conductive patterns 22 and 23, and the conductive pads 24 and 25, respectively, electrostatic attractive forces 26 and 27 occur between the conductive layers 20 and 21, and the vibrator 5. The tilt of the vibrator 5 can be corrected by adjusting each of the right and left electrostatic attractive forces 26 and 27 to the vibrator 5 through adjusting each of the voltages to be applied to the conductive layers 20 and 21.

Specifically, if the vibrator 5 tilts downwardly to the right as indicated by a broken line α in FIG. 6B, a DC voltage higher than that applied to the conductive layer 21 is applied to the conductive layer 20. Thereby, the electrostatic attractive force 26 acting on the left edge area of the vibrator 5 opposed to the conductive layer 20 becomes larger than the electrostatic attractive force 27 acting on the right edge area of the vibrator 5 opposed to the conductive layer 21, so that the left edge area of the vibrator 5 is pulled toward the fixed substrate 2 side more strongly than the right edge area of the vibrator 5, whereby the downward tilt to the right is corrected.

If the vibrator 5 tilts upwardly to the right as indicated by a broken line β in FIG. 6B, a DC voltage higher than that applied to the conductive layer 20 is applied to the conductive layer 21. Thereby, the electrostatic force 27 becomes larger than the electrostatic force 26, so that the right edge area of the vibrator 5 is pulled toward the fixed substrate 2 side more strongly than the left edge area of the vibrator 5, whereby the downward tilt to the right is corrected.

In the resonant element 1 shown in FIG. 6, by providing the conductive layers 20 and 21, the tilt of the vibrator 5 can be corrected, which leads to an improvement in the vibrating conditions of the vibrator 5.

Figure 7:
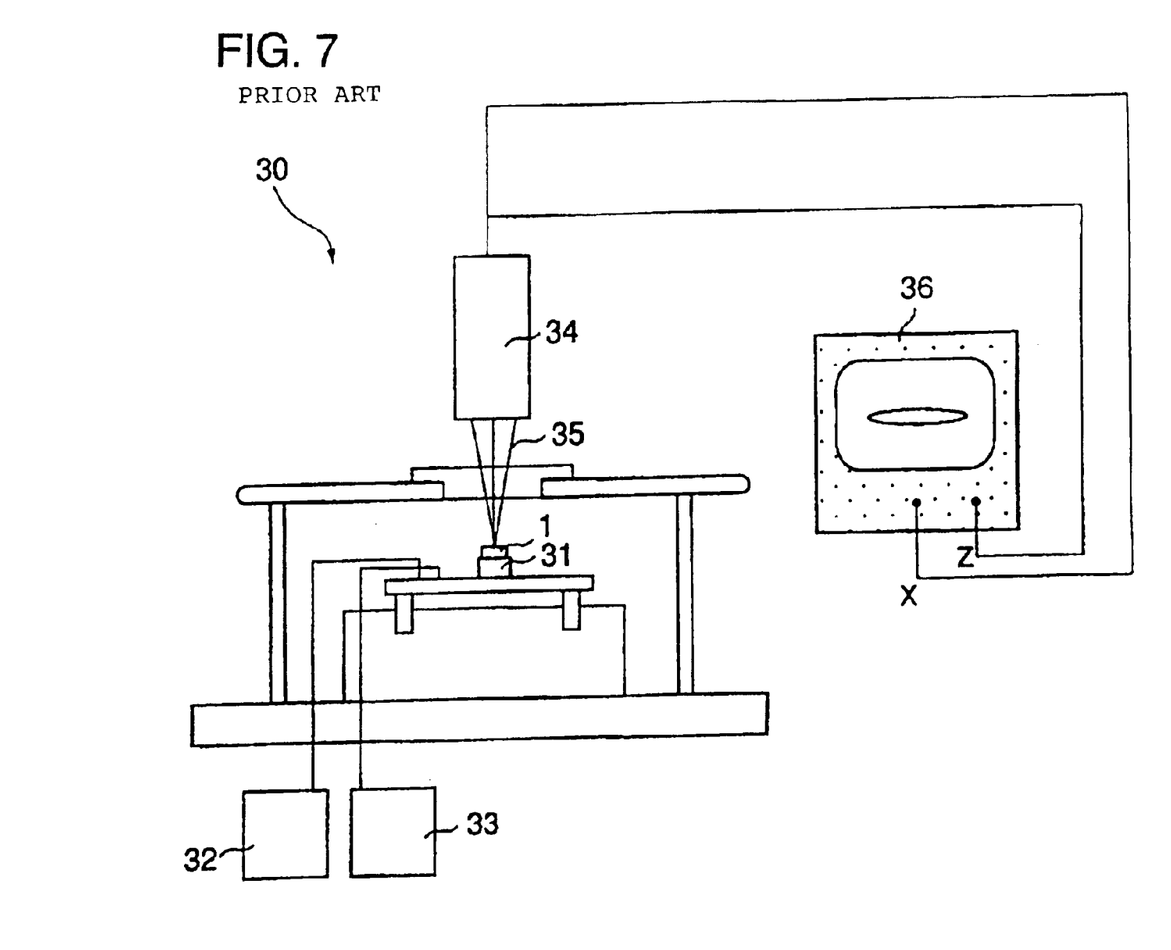
FIG. 7 is a model diagram illustrating an example of a previous system for performing the vibration adjustment for a resonant element.

Meanwhile, in order to find the optimum applied voltage to the conductive layers 20 and 21 for correcting the tilt of the vibrator 5, the present applicant has performed the following vibration adjustments for the vibrator 5, utilizing a large-scale vibration measuring system 30 as shown in FIG. 7.

For example, a resonant element 1 is disposed on a specimen holding stand 31, driving means (not shown) for AC voltage application is conductively connected to the fixed side comb electrodes 11, and first DC bias applying means 32 is conductively connected to the conductive layer 20 via the electrode pad 24 and the conductive pattern 22. In the same manner, second DC bias applying means 33 is conductively connected to the conductive layer 20 via the electrode pad 25 and the conductive pattern 23.

Then, in the state wherein the vibrator 5 is caused to be subjected to an excitation vibration by the driving means, the vibrator 5 under excitation vibration is radiated by laser rays 35 from a laser displacement meter 34. By utilizing the reflected laser rays from the vibrator 5, signals in response to displacements in the X-direction and in the Z-direction of the vibrator 5 are outputted from the laser displacement meter 34 to an oscilloscope 36.

The vibrating conditions of the vibrator 5 in the X-Z plane can be viewed on the screen of the oscilloscope 36. While viewing the screen of the oscilloscope 36, a vibration adjustment operator individually varies the magnitudes of the voltages to be applied to the conductive layers 20 and 21, by controlling the first and second DC bias applying means 32 and 33, respectively. Thereby, the vibration adjustment operator obtains the optimum values of the applied voltage to the conductive layers 20 and 21, wherein the deflection of the vibrator 5 in the Z-direction can be eliminated, or suppressed to a very small amount.

In this manner, vibration adjustments for the vibrator 5 utilizing the vibration measuring system 30 shown in FIG. 7 are performed.

After the optimum values of the applied voltage to the conductive layers 20 and 21 have been obtained as described above, the resonant element 1 is removed from the specimen holding stand 31 of the vibration measuring system 30, and then, for example, is built into a predetermined sensor device or the like. The sensor device into which the resonant element 1 having the conductive layers 20 and 21 shown in FIGS. 6A and 6B is to be built, is provided with means for individually applying DC voltages to the conductive layers 20 and 21, and the means is set so that voltages having the optimum values are each applied to the conductive layers 20 and 21. This allows the vibrator 5 of the resonant element 1 to be subjected to an ideal excitation vibration in the X-direction without deflection in the Z-direction, and allows the resonant element 1 to be improved in characteristics.

However, there has been a problem that, in order to obtain the above-described optimum values of the applied voltages to the conductive layers 20 and 21, a large-scale and costly vibration measuring system 30 is required. Also, as described above, the vibration adjusting method for the vibrator 5 has been a manual method such that the operator obtains the optimum values of the applied voltages to the conductive layers 20 and 21 by controlling the first and second DC bias applying means 32 and 33, respectively, while viewing the screen of the oscilloscope 36. As a result, the vibration adjustment is both costly and time consuming.

Furthermore, as described above, since the operator performs the vibration adjustment for the vibrator 5 based on vibration conditions (vibrational loci) of the vibrator 5 in the X-Z plane while viewing the screen of the oscilloscope 36, there is a problem in that an improvement in the adjustment accuracy is limited by the skill of the operator.

Moreover, in accordance with the vibration adjustment method as described above, after the optimum value of the applied voltage to the conductive layers 20 and 21 has been obtained by the vibration measuring system 30, the resonant element 1 is removed from the specimen holding stand 31 of the vibration measuring system 30, and is built into a predetermined sensor device or the like. Therefore, even though the optimum values of the applied voltages to the conductive layers 20 and 21 have been obtained by the vibration measuring system 30, for example, the stresses within the support beams 7 of the resonant element 1 can change when the resonant element 1 is removed from the specimen holding stand 31 and is built into a predetermined sensor device, and thereby the optimum voltage values of the applied voltages to the conductive layers 20 and 21 can change into different voltages from the optimum voltages values. In such a case, the vibrator 5 of the resonant element 1 in the sensor device will not be subject to an optimum excitation vibration.

If the optimum voltage value of the applied voltage to the conductive layers 20 and 21 has thus changed, it will be necessary to again dispose the resonant element 1 in the vibration measuring system 30 and to again perform the above-described vibration adjustment. This is very troublesome, however, and it is virtually impracticable after the resonant element 1 has been built into the sensor device.

SUMMARY OF THE INVENTION

The present invention solves the above-described problems. It is a first object of the present invention to allow the vibration adjustment for the vibrator for inhibiting the deflection of the vibrator (vibrating body) in the Z-direction during the excitation vibration thereof in the X-direction to be easily performed, without the need for a large-scale apparatus. It is a second object to facilitate the automation of the vibration adjustment for the vibrator. It is a third object to provide a resonant element allowing the vibration adjustment for the vibrator to be performed in the state wherein the vibrator has been built into the sensor device.

In order to achieve the objects, the present invention has the following constitutions as means for solving the above-described problems. In accordance with a first aspect, the resonant element includes a vibrating body vibratable in orthogonal X- and Z-directions; exciting means for causing the vibrating body to be subjected to an excitation vibration in the X-direction; excitation deflection detecting means for detecting the deflection of the vibrating body in the Z-direction during the excitation vibration thereof in the X-direction; and excitation deflection inhibiting means for inhibiting the deflection of the vibrating body in the Z-direction.

The resonant element in accordance with another aspect constitutes an angular velocity sensor for detecting the angular velocity around a Y-axis orthogonal to the X- and Z-direction based on the vibration of the vibrating body in the Z-direction by a Coriolis force, and the angular velocity sensor has Z-direction vibration detecting means for detecting the vibration of the vibrating body in the Z-direction, the Z-direction vibration detecting means also serving as excitation deflection detecting means.

In accordance with another aspect, the excitation deflection detecting means is constituted of a detecting electrode for detecting the variation in the electrostatic capacity with respect to the vibrating body in response to the vibration of the vibrating body in the Z-direction, and the excitation deflection detecting means detects the variation in the detected electrostatic capacity by the detecting electrode during the excitation vibration thereof in the X-direction, as a deflection of the vibrating body in the Z-direction.

In accordance with another aspect, the vibrating body is disposed so as to be opposed to the plane of the X-Y plane direction of the fixed substrate, and the vibrating body constitutes a planar vibrating body supported by the fixed substrate via support beams so as to be vibratable in the X-direction.

In accordance with another aspect, the invention is directed to a vibration adjustment method for a resonant element which includes a vibrating body vibratable in orthogonal X- and Z-directions, exciting means for causing the vibrating body to be subjected to an excitation vibration in the X-direction, a detecting electrode for detecting the variation in the electrostatic capacity with respect to the vibrating body in response to the vibration thereof in the Z-direction; and excitation deflection inhibiting means which give electrostatic attractive forces to the vibrating body and which inhibit the deflection of the vibrating body in the Z-direction during the excitation vibration thereof in the X-direction by the electrostatic attractive forces. In the vibration adjustment method in accordance with this aspect, the variation in the detected electrostatic capacity by the detecting electrode is detected as a deflection of the vibrating body in the Z-direction, while the vibrating body is caused to be subjected to an excitation vibration in the X-direction by the exciting means; and the electrostatic attractive forces given to the vibrating body by the excitation deflection inhibiting means are controlled in the direction such that the variation in the detected electrostatic capacity by the detecting electrode is canceled.

The vibration adjustment method for a resonant element in accordance with another aspect converts the detected electrostatic capacity by the detecting electrode into a voltage, the deflection of the vibrating body in the Z-direction during the excitation vibration thereof in the X-direction is detected based on the variation in the voltage.

The vibration adjustment method for a resonant element in accordance with another aspect, converts the detected electrostatic capacity by the detecting electrode into a voltage using capacity-voltage converting means comprising FET.

In a vibration adjustment method for a resonant element in accordance with another aspect, the resonant element constitutes an angular velocity sensor for detecting the angular velocity around the Y-axis by a Coriolis force based on the vibration of the vibrating body in the Z-direction. The angular velocity sensor has Z-direction vibration detecting means for detecting the vibration of the vibrating body in the Z-direction utilizing the variation in the electrostatic capacity; and capacity-voltage converting means for converting the detected electrostatic capacity by the detecting electrode into a voltage, the Z-direction vibration detecting means also serving as excitation deflection detecting means; and the capacity-voltage converting means also serves as capacity-voltage converting means for detecting an excitation deflection.

In the present invention, when performing vibration adjustment for the resonant element by providing the resonant element with excitation deflection detecting means and excitation deflection inhibiting means, the deflection of the vibrating body in the Z-direction during the excitation vibration thereof in the X-direction is detected by the excitation deflection detecting means, and the excitation deflection inhibiting means are adjusted in a direction such that the deflection in the Z-direction is eliminated. Thereby, the deflection of the vibrating body in the Z-direction during the excitation vibration thereof in the X-direction can be inhibited, and the vibrating body can be caused to be subjected to an ideal excitation vibration in the X-direction. This makes it possible to avoid the problem of the characteristics deterioration of the resonant element caused by the deflection of the vibrating body in the Z-direction.

Since the resonant element is in itself provided with the excitation deflection detecting means, there is no need for large-scale equipment for measuring the vibrating conditions of the vibrating body as described above, which leads to a reduction in equipment cost.

Also, since the vibration adjustment for the vibrator of the resonant element can be performed in the state wherein the vibrator has been built in the sensor device, it is possible to prevent the problem that, even though the vibration adjustment for the vibrating body has been performed stresses, for example, within the support beams supporting the vibrating body change when the resonant element is built into the sensor device, resulting in the vibrating body not being subjected to an ideal excitation vibration.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF PREFERRED EMBODIMENTS

Hereinbelow, the embodiments in accordance with the present invention will be described based on the drawings.

Figure 1:
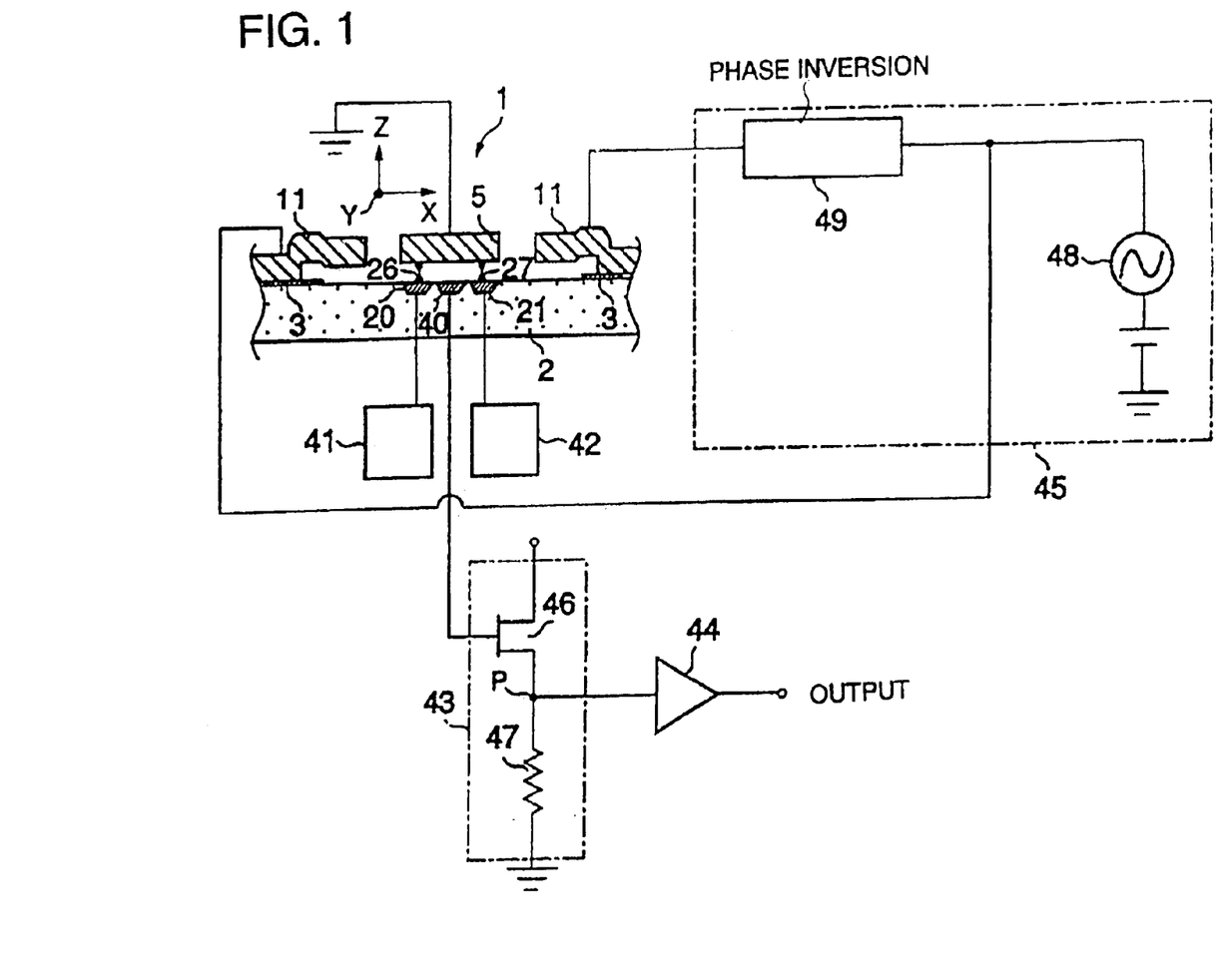
FIG. 1 is an explanatory view showing an embodiment of a resonant element in accordance with the present invention, together with the main construction of a characteristic vibration adjusting system.

FIGS. 1A and 1B show one embodiment of a resonant element 1 in accordance with the present invention, together with a vibration adjustment system for characterizing the resonant element. In the descriptions of this embodiment, the same components as the above described examples of previous resonant elements are identified by the same reference numerals, and repeated explanations of the common components are omitted.

The resonant element 1 shown in FIGS. 1A and 1B can be used as an acceleration sensor, angular velocity sensor, pressure sensor, filter, or the like. The resonant element 1 has substantially the same construction as the proposed resonant element shown in FIG. 6, but this embodiment is characterized in that a detecting electrode 40 which is an excitation deflection detecting means is disposed on the top surface 2a of the fixed substrate 2 so as to be opposed to and spaced from the vibrator 5.

Since the vibrator 5 is formed of polysilicon and has electric conductivity, it is possible, by forming the above-mentioned detecting electrode 40, to detect, by the detecting electrode 40, variation in the spacing between the top surface 2a of the fixed substrate 2 and the vibrator 5, that is, the vibration (deflection) of the vibrator 5 in the Z-direction, as a variation in the electrostatic capacity, When the resonant element 1 is used as an angular velocity sensor, for example, the detecting electrode 40 similar to the above-described one, is formed on the top surface 2a of the fixed substrate 2 as Z-direction vibration detecting means, in order to detect the vibration amplitude of the vibrator 5 in the Z-direction due to a Coriolis force. In such a case, the Z-direction vibration detecting means (detecting electrode 40) also serves as excitation deflection detecting means.

The characteristic vibration adjusting system in this embodiment shown in FIG. 1 is arranged to perform a vibration adjustment with respect to the resonant element 1 having the above-described excitation deflection detecting means (detecting electrode 40), and comprises a first DC voltage applying means 41, a second DC voltage applying means 42, capacity-voltage converting means 43, an amplifier 44, and driving means 45.

The first and second DC voltage applying means 41 and 42 are conductively connected to conductive layers 20 and 21, respectively, and have a capability of applying DC voltages to the respective conductive layers 20 and 21 and of changing the magnitude of the DC voltages to be applied.

The capacity-voltage converting means 43 comprises FET 46 and a source resistor 47. As shown in FIG. 1, the gate-side of the FET 46 is conductively connected to the detecting electrode 40, one end side of the source resistor 47 is connected to the source-side of the FET 46, and the other end side of the source resistor 47 is grounded.

In the capacity-voltage converting means 43, the voltage corresponding to the electrostatic capacity between the vibrator 5 and the detecting electrode 40 occurs at the connection point P between the source-side of the FET 46 and the source resistor 47. In other words, the capacity-voltage converting means 43 converts the electrostatic capacity between the vibrator 5 and the detecting electrode 40 into a voltage and outputs the voltage from connection point P. The amplifier 44 is connected to the connection point P and amplifies and outputs the voltage corresponding to the electrostatic capacity between the vibrator 5 and the detecting electrode 40.

In the vibration adjusting system in this illustrated embodiment, since the capacity-voltage converting means 43 converts the electrostatic capacity detected by the detecting electrode 40 into a voltage, the vibration (deflection) of vibrator 5 in the Z-direction can be detected as a voltage variation.

The driving means 45 comprises an AC power source 48 and a phase inversion portion 49. One of the fixed-side comb electrodes 11a and 11b of the resonant element 1 is conductively connected to the AC power source 48 directly, and the other is conductively connected to the AC power source 48 via the phase inversion portion 49. By this driving means 45, AC voltages which are different in phase from each other by 180° are applied respectively to the fixed-side comb electrodes 11a and 11b of the resonant element 1, and thereby the vibrator 5 can be subjected to an excitation in the X-direction.

A vibration adjusting method for the resonant element 1 may include, for example, conductively connecting an oscilloscope (not shown) to the output-side of the amplifier 44 and then subjecting the vibrator 5 to an excitation vibration in the X-direction, while viewing the waveform of the voltage output by the amplifier 44 is viewed on the screen of the oscilloscope.

Figure 2:
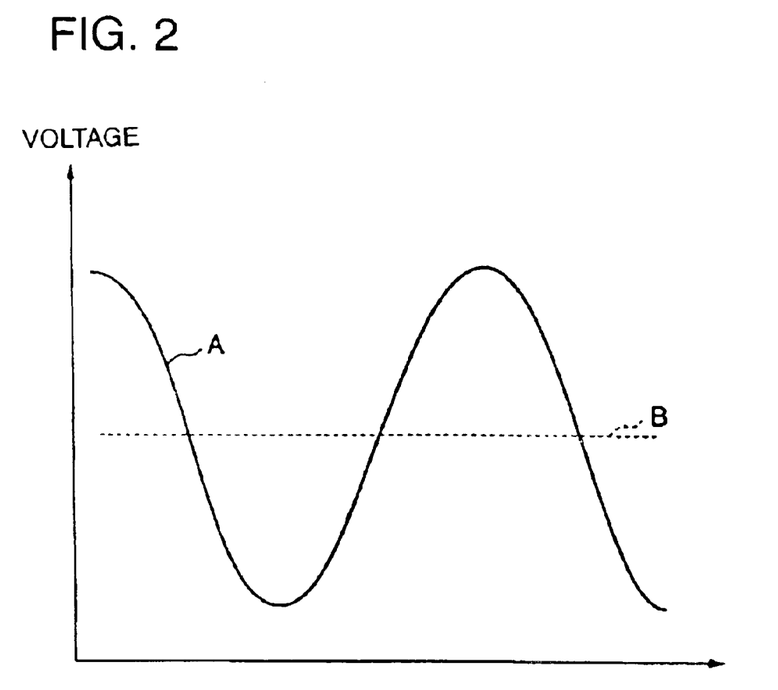
FIG. 2 is a graph showing an example of the voltage waveform in response to the electrostatic capacity between a vibrator and a detecting electrode.

In some cases, even though no angular velocity around the Y-axis is applied during the excitation vibration of the vibrator 5, a voltage waveform as indicated by a solid line A in FIG. 2 is viewed with the oscilloscope, the voltage waveform varying in response to the excitation vibration of the vibrator 5 in the X-direction.

In such a case, since deflection in the Z-direction arises during the excitation vibration of the vibrator 5, a vibration adjustment for the vibrator 5 is performed. For example, while viewing the voltage waveforms shown up on the screen of the oscilloscope, the DC voltages to be each applied to the conductive layers 20 and 21 are varied by controlling the first DC voltage applying means 41 or the second DC voltage applying means 42. The applied voltages for the conductive layers 20 and 21 at the time when the voltage waveform on the screen of the oscilloscope becomes a waveform wherein substantially no vibration amplitude can be seen and wherein the voltage converges into a given voltage, as indicated by the dotted line B in FIG. 2, i.e., at the time when the variation in the detected electrostatic capacity by the detecting electrode 40 disappears, or is substantially removed, is detected as the voltage optimum for the vibration adjustment for the vibrator 5.

For example, when a voltage waveform indicated by the solid line A in FIG. 2 is viewed on the screen of the oscilloscope, for example, in the state wherein the conductive layer 20 of the resonant element 1 is maintained at a given voltage (0 volt for example), the applied voltage for the conductive layer 21 is varied by variably controlling the second voltage applying means 42 while viewing the voltage waveform on the screen of the oscilloscope. The voltage at the time when the voltage waveform on the screen of the oscilloscope converges into a waveform wherein substantially no vibration amplitude can be seen, as indicated by the dotted line B in FIG. 2, is detected as the optimum voltage for the conductive layer 21. This detected optimum voltage for the conductive layer 21, and the fixed voltage (0 volt for example) of the above-described conductive layer 20 are detected as the voltages optimum for the vibrator 5.

Conversely, of course, the applied voltage for the conductive layer 20 may be varied in the state wherein the conductive layer 21 is maintained at a given voltage (0 volt for example), and the voltage at the time when the voltage waveform on the screen of the oscilloscope converges into a vibration amplitude wherein substantially no vibration amplitude can be seen, as indicated by the dotted line B in FIG. 2, may be detected as the optimum voltage for the conductive layer 20, whereby the voltage optimum for the vibration adjustment for the vibrator 5 is detected. Or, the voltage optimum for the vibration adjustment for the vibrator 5 may be detected by individually varying the applied voltages for the conductive layers 20 and 21 and thereby obtaining the optimum voltages to the conductive layers 20 and 21.

As described above, by performing the vibration adjustment for the vibrator 5 through controlling the applied voltage to the conductive layers 20 and 21, the vibrator 5 can be caused to be subjected to an ideal excitation vibration substantially without deflection in the Z-direction.

The above-described effect has been verified in experiments by the present inventor. In these experiments, the present inventor has built the resonant element 1 having a characteristic construction in this embodiment into the vibration adjusting system shown in FIG. 1, and in the state wherein the conductive layer 20 is fixed at a given voltage (0 volt for example), the inventor has investigated as to how the voltage waveform output by the connection point P of the above-described capacity-voltage converting means varies as the applied voltage V21 to the above-described conductive layer 21 is varied.

Figure 3:
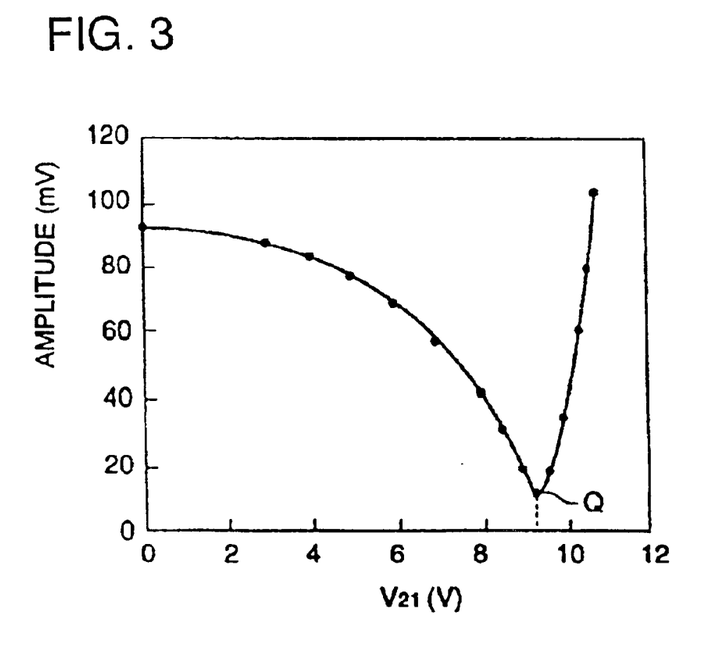
FIG. 3 is a graph showing an example of the variation in the voltage in response to the electrostatic capacity between a vibrator and a detecting electrode in accordance with the variation in the applied voltage to conductive layers.

FIG. 3 is a graph illustrating the experimental results. In FIG. 3, the horizontal axis designates the applied voltage to the conductive layer 21, and the vertical axis designates the amplitude of the voltage waveform output by the connecting point P of the capacity-voltage converting means 43. In the above-described experiments, the detecting electrode 40 has dimensions of 0.5×0.5 mm, and the interval between the detecting electrode 40 and the vibrator 5 is 2 mm. The vibrator 5 is caused to be subjected to an excitation vibration in the X-direction under the frequency of 7.623 kHz.

As shown in FIG. 3, as the applied voltage V21 to the above-described conductive layer 21 is varied, the amplitude of the voltage waveform output by the connection point P of the capacity-voltage converting means 43 varies, and the amplitude of the voltage waveform at the connection point P is minimized at the point Q (at this point, the applied voltage V21 is 9.34 V). In accordance with the investigated movement of the vibrator 5 in the X-Z plane, the vibrator 5 exhibited loci as shown in FIG. 8B. That is, as illustrated in FIG. 10C, the vibrator 5 was being subjected to an excitation vibration horizontally in the X-direction along the plane of the fixed substrate in the X-Y plane direction, and substantially without deflection in the Z-direction.

As shown in these experimental results, by performing the vibration adjustment for the vibrator 5 so that the variation in the detected electrostatic capacity by the detecting electrode 40 is canceled, the vibrator 5 can be caused to be subjected to an excitation in the X-direction.

Figure 4:
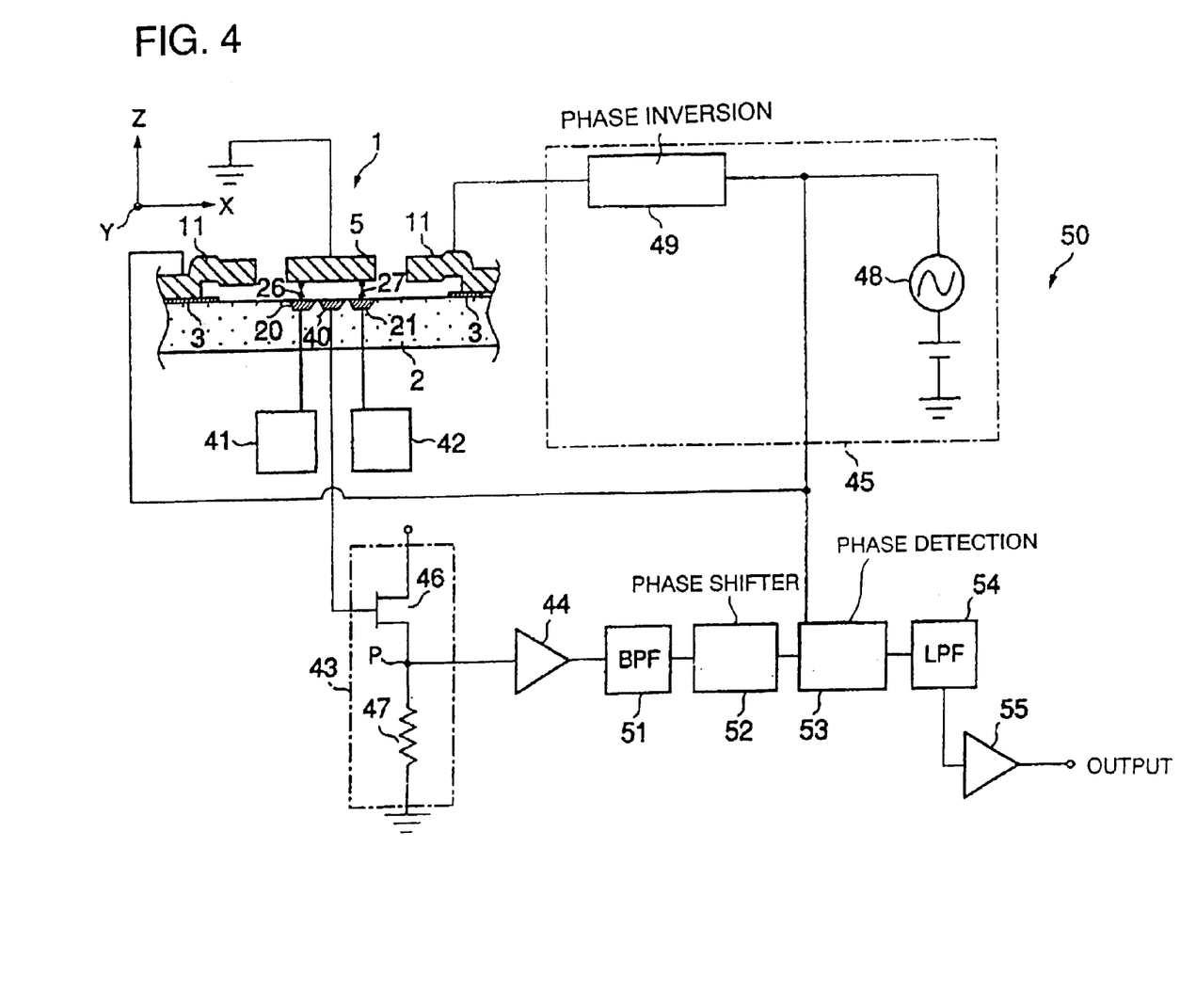
FIG. 4 is an explanatory view showing an example of a main circuit configuration of the sensor device into which a resonant element as an angular velocity sensor is to be built.

FIG. 4 shows one example of a main circuit configuration of the sensor device 50 into which a resonant element 1 as an angular velocity sensor has been built. In the sensor device 50, the vibrator 5 is caused to be subjected to an excitation vibration in the X-direction by applying AC voltages which are different in the phase from each other by 180° to the fixed-side comb electrodes 11a and 11b, respectively, of the resonant element 1 by driving means 45. At the same time, a Coriolis force is applied to the vibrator 5 due to the angular velocity around the Y-axis. Variation in the electrostatic capacity with respect to the vibrator 5 resulting from vibration of the vibrator 5 in the Z-direction is output by the detecting electrode 40, and the electrostatic capacity is converted into a voltage by the capacity-voltage converter 43. The voltage after the conversion is amplified by the amplifier 44, and is applied to a phase detection portion 53 via a BPF (band-pass filter) 51 and a phase shifter 52.

The phase detection portion 53 takes in the AC voltage output by an AC power source 48 as a reference signal, and performs a phase detection with respect to the voltage applied by the phase shifter portion 52 utilizing the reference signal. The signal obtained by this phase detection is output as a detecting signal for angular velocity around the Y-axis via a LPF (low-pass filter) and the amplifier 55.

As shown in FIG. 4, the angular velocity sensor 50 has the first and second AC voltage applying means 41 and 42, the capacity-voltage converting means 43, the amplifier 44, and the driving means 50 which constitute the vibration adjusting system shown in FIG. 1. Therefore, when performing a vibration adjustment for the resonant element 1 as an angular velocity sensor, it is possible, after building the resonant element 1 into the sensor device 50, to utilize, for vibration adjustment, the above-described first and second AC voltage applying means 41 and 42, the capacity-voltage converting means 43, the amplifier 44, and the driving means 50 to perform a vibration adjustment for the resonant element 1.

In accordance with this embodiment, since the resonant element 1 is constituted so as to have a detecting electrode 40, and to detect the deflection of the vibrator 5 in the Z-direction by this detecting electrode utilizing the variation in the electrostatic capacity, the vibration adjustment can be performed by the simple vibration adjusting system shown in FIG. 1, without the need to use a large-scale vibration measuring system, such as the system shown in FIG. 7.

Since the vibration adjustment for the vibrator 5 can be easily performed, the time required for the vibration adjustment for the vibrator 5 can be reduced, and the adjustment cost can be reduced. Also, since this embodiment is constituted so that the deflection of the vibrator 5 in the Z-direction is detected utilizing the variation of the electrostatic capacity, the deflection of the vibrator 5 in the Z-direction can be detected with a much higher accuracy than the case where the deflection of the vibrator 5 in the Z-direction is detected utilizing laser rays as described above. This results in an improvement in the accuracy of the vibration adjustment for the vibrator 5.

Furthermore, in addition to having a simple construction, the characteristic vibration adjusting system in this embodiment has features, as described above, such as to detect the deflection of the vibrator 5 in the Z-direction utilizing the variation in the electrostatic capacity, to convert the electrostatic capacity into a voltage, and to detect the variation in the electrostatic capacity based on the variation in the voltage. Therefore, the automation of the vibration adjustment wherein the optimum value of the applied voltages for the above-described conductive layers 20 and 21 are obtained utilizing the variation in the voltage in response to the deflection of the vibrator 5 in the Z-direction, can be easily achieved.

Moreover, in the case of an angular velocity sensor, since there is provided Z-direction vibration detecting means (detecting electrode 40) for detecting the vibration of the vibrator 5 in the Z-direction due to a Coriolis force, the Z-direction vibration detecting means can be caused to do double duty as excitation deflection detecting means for vibration adjustment. Thereby, the vibration adjustment can be performed easily and with a high accuracy as describe above without the need to change the design.

In addition, since the units constituting the vibration adjusting system shown in FIG. 1 are incorporated in the sensor device 50 into which the resonant element 1 as an angular velocity sensor is to be built, the vibration adjustment of the angular velocity sensor can be performed in the state wherein the angular velocity sensor has been built into the sensor device 50. This make it possible to prevent the occurrence of the problem that, even though vibration adjustment has been performed, the stresses within the support beams 7 of the vibrator 5 change when the resonant element 1 is built into the sensor device 50, and the optimum applied voltages to the conductive layers 20 and 21 change with the result that the vibrator 5 of the angular velocity sensor cannot be appropriately caused to be subjected to an excitation vibration without deflection in the Z-direction.

The present invention is not limited to the above-described embodiment, but various embodiments may be adopted. For example, in the above-described embodiment, the detecting electrode 40 is disposed on the fixed substrate 2, but, for example, when there is a cover member covering the upper side of the vibrator 5 with an interval interposed, the detecting electrode 40 may be disposed at the area opposed to the vibrator 5 on the cover member. Or, the detecting electrodes 40 may be provided on both of the fixed substrate 2 and the cover member. The same goes for the conductive layers 20 and 21. That is, the conductive layers 20 and 21 may be provided not only on the fixed substrate 2, but also on the above-mentioned cover member, or may be provided on both of the fixed substrate 2 and the cover member.

Also, the detecting electrode 40 is disposed so as to be opposed to the central area of the vibrator 5 with a gap interposed. However, the detecting electrodes 40 may be, for example, disposed so as to be opposed to both edge areas of the vibrator 5 with a gap in the X-direction therebetween.

Figure 5A:
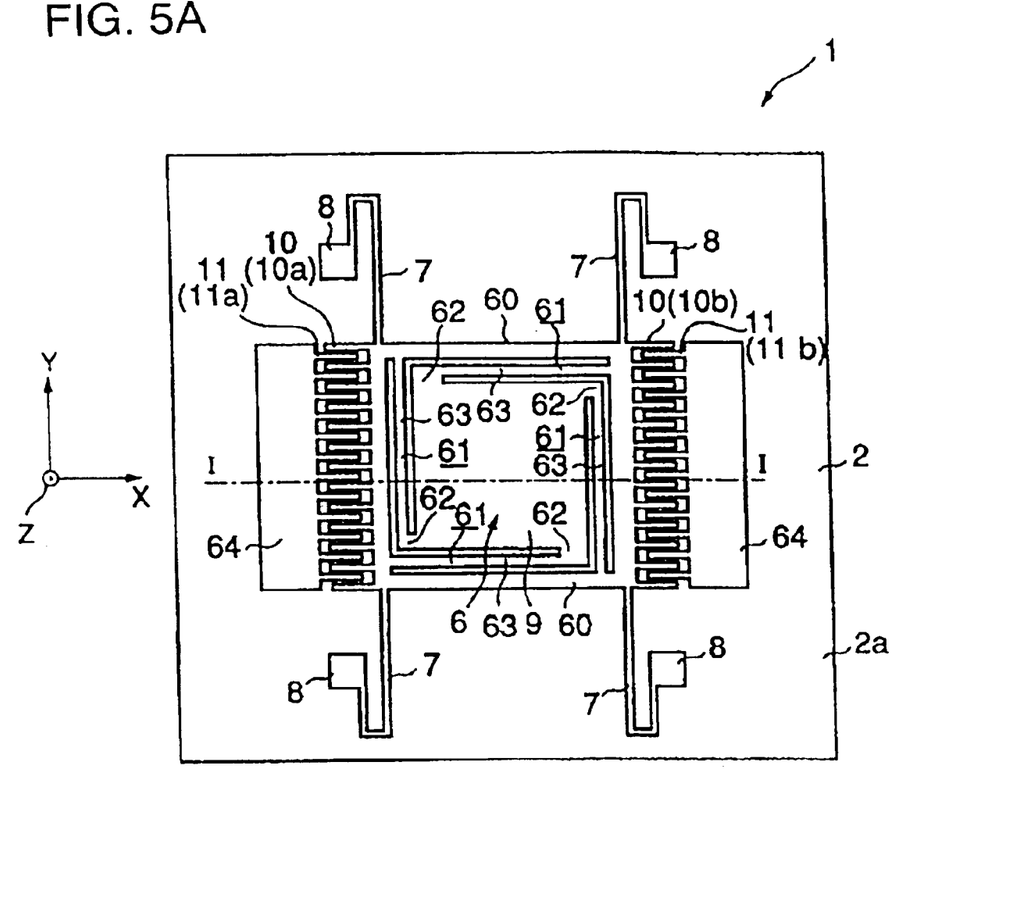
FIGS. 5A and 5B are explanatory views showing another embodiment of a resonant element.
Figure 5B:
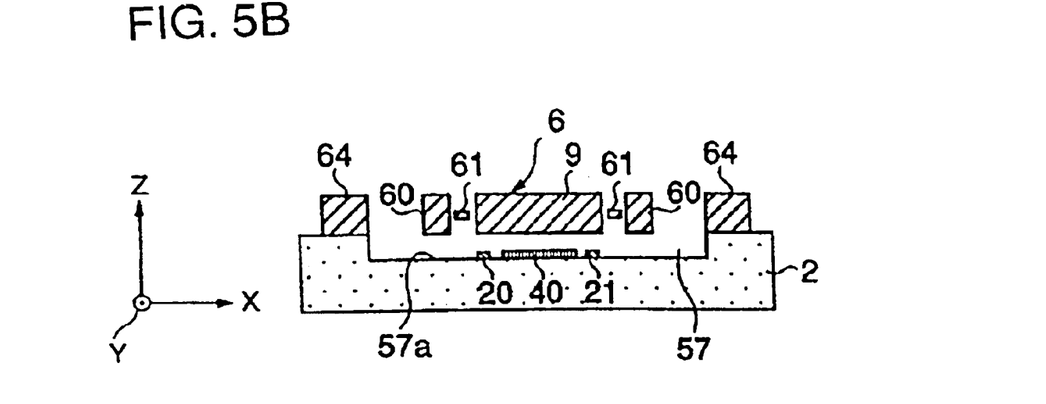

Also, the configuration of the resonant element 1 is not limited to that of the embodiment illustrated. The present invention can be applied to resonant elements 1 having various configurations. For example, the present invention can be applied to the resonant element 1 as shown in FIGS. 5A and 5B. In FIGS. 5A and 5B, a cavity (depression) 57 is formed in the top surface 2a which is a plane in the X-Y plane direction of the fixed substrate 2 which is made of glass. The bottom surface 57a of this cavity 57, like the top surface 2a, forms a plane in the X-Y plane and a planar vibrating body 6 is disposed so as to be opposed to the bottom surface 57a with a gap interposed in the Z-direction.

The planar vibrating body 6 shown in FIGS. 5A and 5B is a combined body wherein a weight 9 is connected to the inside of a frame body 60 by four connection beams (detecting beams) 61. The weight 9 has a square shape, and each of the connection beams has a L-letter shape. The tips of the shorter sides 62 of the L-letter shaped connection beams 61 each communicates with and are connected to the four corners of the weight 9. The longer sides 63 of the L-shaped connection beams 61 are each extended from the shorter sides 62 along the sides of the frame body 60 via a gap, and the tips of the extension portions thereof each communicates with and are connected to the corners of the frame body 60.

A plurality of fixing portions 8 (four fixing portions in the figure) is each fixedly disposed on the fixed substrate 2 with gaps therebetween so as to surround the planar vibrating body 6, and the planar vibrating body 6 is fixedly supported by hooked-claw shaped support beams (driving beams) 7 so as to be vibratable in the X-direction.

On both right and left sides (as viewed in FIG. 5A) of the planar vibrating body 6, movable-side comb electrodes 10 (10a and 10b) are formed outwardly in the X-direction, and fixed-side comb electrodes 11 (11a and 11b) are each extended from the fixing portion 64 so as to be interdigitated with the above-mentioned movable-side comb electrodes 10 with a gap interposed. These movable-side comb electrodes 10 and fixed-side comb electrodes 11 make up exciting means.

The resonant element 1 of FIGS. 5A and 5B, similarly to the embodiment shown in FIG. 1, is provided with conductive layers 20 and 21, and detecting electrode 40 which is excitation deflection detecting means for detecting the deflection of the weight 9 (planar vibrating body 6) in the Z-direction. By performing vibration adjustment in the same manner as vibration adjustment is performed for the embodiment of FIG. 1, the weight 9 (planar vibrating body 6) can be caused to be subjected to an ideal excitation vibration.

As explained above, in accordance with the present invention, since the resonant element 1 is provided with excitation deflection inhibiting means, as well as the resonant with excitation deflection detecting means, the deflection of the vibrating body in the Z-direction during the excitation vibration thereof in the X-direction can be detected, and the deflection of the vibrating body in the Z-direction can be inhibited by the above-described excitation deflection inhibiting means, without the need for large-scale equipment for measuring the vibrating conditions of the vibrating body. Thereby, the vibrating body can be caused to be subjected to an ideal excitation vibration in the X-direction without deflection in the Z-direction, and hence it is easy to improve characteristics of the resonant element.

In the resonant element constituting an angular velocity sensor, since it is possible to make the Z-direction vibration detecting means do double-duty as excitation vibration deflection detecting means, a resonant element having superior characteristics can be provided without a large change in design.

In the excitation vibration deflection detecting means constituted of detecting means for the variation in the electrostatic capacity with respect to the vibrating body in response to the vibration thereof in the Z-direction, since the deflection of the vibrating body in the Z-direction can be detected with a high accuracy by a very simple construction, it is possible to inhibit more surely the deflection of the vibrating body in the Z-direction during the excitation vibration thereof in the X-direction, which provides a resonant element having more excellent characteristics.

The invention is applicable to a vibrating body which is a planar vibrating body disposed so as to be opposed to the plane in the X-Y plane direction and supported by a fixed substrate so as to be vibratable in the X-direction. More specifically, since the deflection of the vibrating body in the Z-direction during the excitation vibration thereof in the X-direction has a significant adverse effect on characteristics of the resonant element, it is very effective to provide the above-described constructions characterizing the present invention.

In accordance with the present invention, it is possible to perform a vibration adjustment for the vibrating body without the need for large-scale equipment, thereby reducing adjustment cost.

Further, in accordance with the present invention, it is possible to further increase the accuracy of vibration adjustment for the vibrating body, and to easily perform a vibration adjustment for the vibrating body, which leads to a reduction in the time required for the vibration adjustment for the vibrating body.

In the resonant element in accordance with the present invention wherein the resonant element constitutes an angular velocity sensor, and wherein the Z-direction vibration detecting means and the capacity-voltage converting means incorporated in the sensor device into which the angular velocity is to be built, also serve a function of vibration adjustment, since the vibration adjustment for the vibrator can be performed in the state wherein the vibrator has been built in the sensor device, it is possible to prevent the occurrence of the problem that the deflecting state of the vibrating body in the Z-direction after assembly becomes different from that at the time of vibration adjustment, and that the deflection of the vibrating body in the Z-direction during the excitation vibration thereof in the X-direction occurs despite the performed vibration adjustment.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A resonant element comprising:

a substrate defining orthogonal X- and Y-directions and further defining a Z-direction orthogonal to both the X- and Y-directions;

a vibrating body opposed to the substrate and vibratable in the orthogonal X- and Z-directions;

a vibration exciting member for causing said vibrating body to be subjected to an excitation vibration in the X-direction;

a detecting electrode disposed on the substrate for detecting any deflection of said vibrating body in the Z-direction during the excitation vibration thereof in the X-direction; and a first conductive portion disposed on the substrate on one side of the detecting electrode and a second conductive portion disposed on the substrate on the other side of the detecting electrode for inhibiting the deflection of said vibrating body in the Z-direction.

2. A resonant element as claimed in claim 1, wherein:
said resonant element includes an angular velocity sensor for detecting the angular velocity around a Y-axis orthogonal to said X- and Z- directions based on vibration of said vibrating body in the Z-direction by a Coriolis force.

3. A resonant element as claimed in claim 1 or 2, wherein:
the detecting electrode detects variation in an electrostatic capacity with respect to said vibrating body in response to a vibration or deflection thereof in the Z-direction.

4. A resonant element as claimed in claim 3, wherein:
said vibrating body includes a planar vibrating body supported by said substrate via support beams so as to be vibratable in the X-direction.

5. A resonant body, as claimed in claim 4, wherein said vibrating body is electrically conductive and the detecting electrode is spaced from said vibrating body such that an electrostatic capacitance is developed between said vibrating body and said electrode.

6. A resonant body, as claimed in claim 5, wherein said vibrating body is disposed above said substrate and said detection electrode is disposed on a surface of said substrate below said vibrating body.

7. A resonant body, as claimed in claim 5, wherein said vibrating body is disposed above said substrate and said detection electrode is disposed in a cavity in said substrate below said vibrating body.

8. A resonant element as claimed in claim 1 or 2, wherein:
said vibrating body includes a planar vibrating body supported by said substrate via support beams so as to be vibratable in the X-direction.

9. An angular velocity sensor comprising:
a vibrating body vibratable in orthogonal X- and Z-directions;
an exciting member for causing said vibrating body to be subjected to an excitation vibration in the X-direction;
a detecting electrode for detecting any deflection of said vibrating body in the Z-direction during the excitation vibration thereof in the X-direction, said detecting electrode detects variation in an electrostatic capacity with respect to said vibrating body in response to a deflection thereof in the Z-direction;
a first conductive portion disposed on the substrate on one side of the detecting electrode and a second conductive portion disposed on the substrate on the other side of the detecting electrode for inhibiting the deflection of said vibrating body in the Z-direction; and
wherein the electrostatic capacity detected by said detecting electrode is converted into a voltage.

10. An angular velocity detector, as claimed in claim 9, wherein said vibrating body is rotatable about the Y-axis orthogonal to said X- and Z-directions to thereby impart an angular velocity to said vibrating body which causes said body to vibrate in the Z-direction due to a Coriolis force and said detection electrode detects the vibration of said vibrating body in the Z-direction.

11. An angular velocity detector, as claimed in claim 9, further comprising a FET which converts the electrostatic capacity into a voltage.

12. A method for adjusting the vibration of a resonant element comprising the steps of:
providing a resonant element including a vibrating body vibratable in orthogonal X- and Z-directions, an exciting member for causing said vibrating body to be subjected to an excitation vibration in an X-direction, a detecting electrode for detecting the variation in an electrostatic capacity with respect to said vibrating body in response to the deflection thereof in the Z-direction, and a first conductive portion disposed on the substrate on one side of the detecting electrode and a second conducting portion disposed on the substrate on the other side of the detecting electrode which provide electrostatic attractive forces to said vibrating body and which inhibit the deflection of said vibrating body in a Z-direction during the excitation vibration thereof in the X-direction;

detecting the variation in the detected electrostatic capacity by said detecting electrode as a deflection of said vibrating body in the Z-direction while the vibrating body is caused to be subjected to an excitation vibration in the X-direction by said exciting member; and controlling said electrostatic attractive forces provided to said vibrating body by said first and second conductive portions in a direction such that the variation in the detected electrostatic capacity by said detecting electrode is canceled.

13. A method for adjusting the vibration of a resonant element as claimed in claim 12, further including: converting the detected electrostatic capacity by said detecting electrode into a voltage; and detecting deflection of said vibrating body in the Z-direction during the excitation vibration thereof in the X-direction by detecting said voltage.

14. A method for adjusting the vibration of a resonant element as claimed in claim 13, wherein:
the detected electrostatic capacity by said detecting electrode is converted into a voltage using a FET.

15. A method for adjusting the vibration of a resonant element as claimed in claim 12, wherein the step of controlling said electrostatic attractive force includes the steps of fixing the voltage of one of the first and second conductive portions and varying the voltage of the other one of the first and second conductive portions until the variation in the electrostatic capacity detected by said detecting electrode is canceled.

16. A method for adjusting the vibration of a resonant element as claimed in claim 12, wherein the step of detecting the variation in the detected electrostatic capacity includes the step of converting the detected electrostatic capacity to a voltage, amplifying the voltage, and providing the amplified voltage to an oscilloscope for viewing of the amplified voltage waveform.

17. A method for adjusting the vibration of a resonant element in an angular velocity sensor and then determining angular velocity, comprising:
providing a resonant element including a vibrating body vibratable in orthogonal X- and Z-directions, an exciting member for causing said vibrating body to be subjected to an excitation vibration in an X-direction, a detecting electrode for detecting the variation in an electrostatic capacity with respect to said vibrating body in response to deflection or vibration thereof in the Z-direction, a first conductive portion disposed on the substrate on one side of the detecting electrode and second conductive portion disposed on the substrate on the other side of the detecting electrode which provide electrostatic attractive forces to said vibrating body and which inhibit the deflection of said vibrating body in a Z-direction during the excitation vibration thereof in the X-direction and a circuit for converting the detected electrostatic capacity by said detecting electrode into a voltage;

detecting a first variation in the detected electrostatic capacity by said detecting electrode caused by a deflection of said vibrating body in the Z-direction while the vibrating body is caused to be subjected to an excitation vibration in the X-direction by said exciting member;

controlling said electrostatic attractive forces provided to said vibrating body by said first and second conductive portions in a direction such that the variation in the first detected electrostatic capacity by said detecting electrode is canceled;

applying an angular velocity to said resonant element about a Y-axis orthogonal to said X-and Z- directions to cause said resonant body to vibrate in the Z-direction due to a Coriolis force;

detecting vibration of said vibrating body in the Z-direction due to said Coriolis force utilizing a second variation in the electrostatic capacity detected by said detecting electrode; and converting said second variation in electrostatic capacity into a voltage using said circuit, said voltage being representative of said angular velocity.

18. A method for adjusting the vibration of a resonant element as claimed in claim 17, wherein the step of controlling said electrostatic attractive force includes the steps of fixing the voltage of one of the first and second conductive portions and varying the voltage of the other one of the first and second conductive portions until the variation in the first electrostatic capacity detected by said detecting electrode is canceled.

19. A method for adjusting the vibration of a resonant element as claimed in claim 17, wherein the step of detecting the first variation in the detected electrostatic capacity includes the step of converting the detected electrostatic capacity to a voltage, amplifying the voltage, and providing the amplified voltage to an oscilloscope for viewing of the amplified voltage waveform.

20. A resonant element comprising:

a substrate defining orthogonal X- and Y-directions and further defining a Z-direction orthogonal to both the X- and Y-directions;

a vibrating body opposed to the substrate and vibratable in the orthogonal X-and Z-directions;

a vibration exciting member for causing said vibrating body to be subjected to an excitation vibration in the X-direction;

a detecting electrode disposed on the substrate for detecting any deflection of said vibrating body in the Z-direction during the excitation vibration thereof in the X-direction; and at least one conductive portion disposed on the substrate for inhibiting the deflection of said vibrating body in the Z-direction;

wherein the vibrating body is supported by hooked-claw shaped beams which contact the substrate in a region exterior to a region defined by the vibrating body and the vibration exciting member.

* * * * *